UNITED STATES PATENT OFFICE.

HERMAN F. BUSCH, OF PITTSBURGH, PENNSYLVANIA, ASSIGNOR TO ARMSTRONG CORK COMPANY, OF PITTSBURGH, PENNSYLVANIA, A CORPORATION OF PENNSYLVANIA.

CORK ARTICLE AND METHOD OF MAKING THE SAME.

1,105,060.   Specification of Letters Patent.   Patented July 28, 1914.

No Drawing.   Application filed May 24, 1911.   Serial No. 629,198.

*To all whom it may concern:*

Be it known that I, HERMAN F. BUSCH, of Pittsburgh, in the county of Allegheny and State of Pennsylvania, have invented a new and useful Improvement in Cork Articles and Methods of Making the Same, of which the following is a full, clear and exact description.

My invention relates to the manufacture of artificial cork from cork waste or granulated cork or similar material.

The object of the invention is to obtain artificial cork which will not dry out and become hard and which will not shrink under normal conditions, but will retain to a high degree its elasticity and flexibility even in a dry atmosphere. Heretofore, such waste or granular cork or ground cork has been made up into artificial cork with the use of albumen as a binder, this albumen being rendered insoluble by heat. Glycerin has also been used to soften the cork particles or granules, but in cases where such processes have been used, the resulting material will not maintain its proper elasticity and flexibility and has shrunk when subjected to dry atmosphere for a continued period. I have discovered that I can use glycerin and albumen in the presence of water and cause the glycerin to be completely absorbed by the cork, provided the water is removed or allowed to evaporate or pass away. In this manner, a superior product is obtained having the desired characteristics above referred to.

In carrying out my invention in its preferred form, the glycerin is mixed with an aqueous solution of albumen, and this aqueous solution is then mixed with the natural cork particles and the wet mixture is compressed into molds, at least a part of whose sides are porous or absorbent, allowing the moisture to pass away or be absorbed by the wall or walls of the mold. For this purpose, the mold may be formed of porous brick or tile. The material is maintained under compression in the mold and is subjected to sufficient heat to cause the albumen to coagulate, this heat at the same time causing the water to be absorbed by the porous walls of the mold, leaving the glycerin free to be absorbed by the cork. The same result may also be obtained by mixing an aqueous solution of albumen with the required amount of glycerin, then mixing this with natural cork particles, and then heating the mixture or otherwise causing the water to evaporate, the temperature, however, being below the coagulating point of albumen. The mixture with the water thus removed is then compressed into molds and held under compression while subjected to a sufficient heat to cause coagulation or denaturalization of the albumen, causing the glycerin to be absorbed by the cork under the temperature reached by the applied heat. The desired result may also be obtained by preparing a solution of albumen, water and glycerin and then evaporating part of the water from this solution, and under such conditions of temperature and pressure as to prevent the coagulation of the albumen. The aqueous solution resulting is then mixed with the cork, the mixture compressed into the molds, and the molds heated to a temperature sufficient to coagulate the albumen and cause the glycerin to be absorbed by the cork.

In all the forms of the process, the material is preferably held under compression during heating and thereafter until it is practically at atmospheric temperature. It should at least be held under pressure until the material is set after removal from the oven.

The advantages of my invention result from the superior character of the article, due to the complete absorption of the glycerin by the cork. This absorption will take place in the absence of water, as in the process above described, giving an article which will retain its elasticity and flexibility under any normal conditions and will not become hard or shrink. The process may be cheaply carried out since there is only one heating required, while at the same time the water is removed either before or during the heating to coagulate the albumen and cause the complete absorption of the glycerin by the cork.

Many changes may be made in the form of apparatus employed, without departing from my invention.

I claim:

1. The method of making artificial cork which consists in mixing cork particles with glycerin and albumen and heating the mixture, the mixture being free from water during at least the final part of the heating operation; substantially as described.

2. The method of making artificial cork, consisting in mixing the cork particles with an aqueous solution of a binder, and glycerin, compressing the mixture, heating it while under pressure and removing the water during the heating operation, substantially as described.

3. The method of making artificial cork, consisting in mixing the cork particles with an aqueous solution of albumen, and glycerin, compressing the mixture, heating it while under pressure and removing the water during the heating operation, substantially as described.

4. The method of making artificial cork, consisting in mixing the cork particles with an aqueous solution of albumen and glycerin, and heating the same in a mold having a porous wall or walls, substantially as described.

5. The method of making artificial cork, consisting in mixing the cork particles with an aqueous solution of a binder, and glycerin and heating the same under pressure in a mold while allowing the water to evaporate and continuing the heating after the water has been removed, substantially as described 6. Artificial cork containing cork particles, glycerin and albumen, said product being free from water, substantially as described.

In testimony whereof I have hereunto set my hand.

HERMAN F. BUSCH.

Witnesses:
A. F. TIBBETTS,
H. M. CORWIN.